United States Patent
Park et al.

(10) Patent No.: US 12,349,213 B2
(45) Date of Patent: Jul. 1, 2025

(54) APPARATUS AND METHOD FOR MANAGEMENT OF ROUTING INFORMATION AND SESSION CONTROL FOR UNMANNED AERIAL SYSTEM (UAS) COMMUNICATION

(71) Applicant: Samsung Electronics Co., Ltd., Suwon-si (KR)

(72) Inventors: Jungshin Park, Suwon-si (KR); Yoonseon Han, Suwon-si (KR); Sangjun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 17/400,749

(22) Filed: Aug. 12, 2021

(65) Prior Publication Data
US 2022/0053582 A1 Feb. 17, 2022

(30) Foreign Application Priority Data
Aug. 12, 2020 (KR) .................. 10-2020-0101270

(51) Int. Cl.
*H04W 76/11* (2018.01)
*H04B 7/185* (2006.01)
(Continued)

(52) U.S. Cl.
CPC ........ *H04W 76/11* (2018.02); *H04B 7/18506* (2013.01); *H04W 40/02* (2013.01); *H04W 60/00* (2013.01)

(58) Field of Classification Search
CPC ..... H04W 76/11; H04W 40/02; H04W 60/00; H04W 88/14; H04W 4/40; H04W 12/088;
(Continued)

(56) References Cited

U.S. PATENT DOCUMENTS

2016/0370800 A1    12/2016  Chau et al.
2019/0297148 A1     9/2019  Zong et al.
(Continued)

FOREIGN PATENT DOCUMENTS

KR    10-2020-0087838 A    7/2020
WO        2019/153863 A1    8/2019
(Continued)

OTHER PUBLICATIONS

Qualcomm Incorporated et al., KI#1, KI#2, KI#3, KI#7, New Sol: Solution for UAV authentication and authorization by USS/UTM, S2-2004672, SA WG2 Meeting #139e, e-Meeting, Jun. 12, 2020.
International Search Report dated Nov. 10, 2021, issued in International Application No. PCT/KR2021/010580.
(Continued)

*Primary Examiner* — Marisol Figueroa
(74) *Attorney, Agent, or Firm* — Jefferson IP Law, LLP

(57) ABSTRACT

A method by a session management function (SMF) for session control in a mobile communication system for unmanned aerial service (UAS) communication is provided. The method includes receiving, from a first user equipment (UE), a protocol data unit (PDU) session establishment request message including a data network name (DNN) configured for UAS, a first UE identifier, and a second UE identifier for the UAS communication with the first UE, obtaining routing information of the second UE from a UAS traffic management (UTM) based on the PDU session establishment request message, establishing a PDU session between the first UE and the second UE based on the routing information, and transmitting, to the first UE, a PDU session setup response message including PDU session setup information.

8 Claims, 7 Drawing Sheets

(51) Int. Cl.
*H04W 40/02* (2009.01)
*H04W 60/00* (2009.01)

(58) Field of Classification Search
CPC .............. H04W 28/24; H04W 80/10; H04B 7/18506; G08G 5/0013; G08G 5/0026; G08G 5/006; G08G 5/0069
See application file for complete search history.

(56) References Cited

U.S. PATENT DOCUMENTS

| | | |
|---|---|---|
| 2020/0045517 A1 | 2/2020 | Park |
| 2020/0404551 A1 | 12/2020 | Wang |
| 2022/0279355 A1* | 9/2022 | Roy .................... H04W 12/50 |
| 2022/0369363 A1* | 11/2022 | Ferdi .................... B64C 39/024 |

FOREIGN PATENT DOCUMENTS

| | | | | |
|---|---|---|---|---|
| WO | 2020/033905 A1 | 2/2020 | | |
| WO | WO-2020200410 A1 * | 10/2020 | ........... | H04L 67/125 |
| WO | WO-2021173583 A1 * | 9/2021 | ........... | G08G 5/0008 |
| WO | WO-2021202960 A1 * | 10/2021 | ........... | G08G 5/0013 |

OTHER PUBLICATIONS

3rd Generation Partnership Project, Technical Specification Group Services and System Aspects, Study on supporting Unmanned Aerial Systems (UAS) connectivity, Identification and tracking (Release 17), 3GPP TR 23.754 V0.2.0, Jul. 2, 2020, (Jun. 2020).
Tomaszewski et al., On 5G Support of Cross-Border UAV Operations, IEEE XP033796195, ICC Workshops, Jun. 7, 2020.
Extended European Search Report dated Jan. 2, 2024, issued in European Application No. 21856193.4-1206.

* cited by examiner

APPARATUS AND METHOD FOR MANAGEMENT OF ROUTING INFORMATION AND SESSION CONTROL FOR UNMANNED AERIAL SYSTEM (UAS) COMMUNICATION

CROSS-REFERENCE TO RELATED APPLICATION(S)

This application is based on and claims priority under 35 U.S.C. § 119(a) of a Korean patent application number 10-2020-0101270, filed on Aug. 12, 2020, in the Korean Intellectual Property Office, the disclosure of which is incorporated by reference herein in its entirety.

BACKGROUND

1. Field

The disclosure relates to a method and an apparatus for controlling communication between an unmanned aerial vehicle (UAV) user equipment (UE) and a UAV controller UE utilizing a wireless communication system.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

As described above, with the development of a wireless communication system, various services can be provided, and there has been a need for a method for providing unmanned aerial system (UAS) services through a wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for controlling communication between an unmanned aerial vehicle (UAV) UE and a UAV controller UE utilizing a wireless communication system.

Additional aspects will be set forth in part in the description which follows and, in part, will be apparent from the description, or may be learned by practice of the presented embodiments.

In accordance with an aspect of the disclosure, a method by a session management function (SMF) for session control in a mobile communication system for unmanned aerial service (UAS) communication is provided. The method includes receiving, from a first user equipment (UE), a protocol data unit (PDU) session establishment request message including a data network name (DNN) configured for UAS, a first UE identifier, and a second UE identifier for the UAS communication with the first UE, obtaining routing information of the second UE from a UAS traffic management (UTM) based on the PDU session establishment request message, establishing a PDU session between the first UE and the second UE based on the routing information, and transmitting, to the first UE, a PDU session setup response message including PDU session setup information.

In accordance with another aspect of the disclosure, a method by a first UE for establishing a session management for UAS communication in a wireless communication system is provided. The method includes transmitting, to a SMF, a PDU session establishment request message including a DNN configured for UAS, a first UE identifier, and a second UE identifier for the UAS communication with the first UE in case that USA communication with a second UE is required, and receiving, from the SMF, a PDU session setup response message including PDU session setup information.

In accordance with another aspect of the disclosure, a SMF apparatus for session control of UAS communication in a mobile communication system is provided. The SMF apparatus includes a transceiver configured to communicate with UEs and network functions of the mobile communication system, a memory, and at least one processor, wherein the at least one processor is configured to receive, from a UE, a PDU session establishment request message including a DNN configured for UAS, a first UE identifier, and a second UE identifier for the UAS communication with the first UE through the transceiver, obtain routing information of the second UE from a UTM based on the PDU session establishment request message, establish a PDU session between the first UE and the second UE based on the routing information, and transmit, to the first UE, a PDU session setup response message including PDU session setup information through the transceiver.

In accordance with another aspect of the disclosure, a first UE for establishing a session of UAS communication in a mobile communication system is provided. The first UE includes a transceiver configured to communicate with a second UE and network functions of the mobile communication system, a memory, and at least one processor, wherein the at least one processor is configured to control to transmit, to a SMF, a PDU session establishment request message including a DNN configured for UAS, a first UE identifier, and a second UE identifier for the UAS communication with the first UE in case that USA communication with the second UE is required, and receive a PDU session setup response message including PDU session setup information.

According to the apparatus and the method according to various embodiments of the disclosure, the control can be effectively performed so that the UAS communication is actually performed only between UEs allowed by a UTM.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
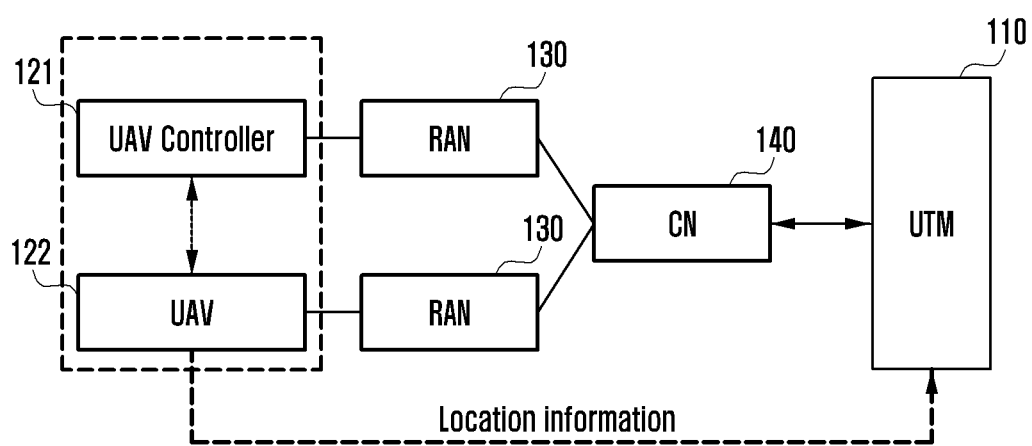
FIG. 1 illustrates an overall structure of unmanned aerial service (UAS) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described below with reference to the accompanying drawings. However, the disclosure is not limited to the embodiments disclosed hereinafter, and it can be implemented in diverse forms. The embodiments are only specific details provided to complete the disclosure and to fully inform those of ordinary skill in the art to which the disclosure pertains of the category of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable data processing apparatus to produce a computer implemented process such that the instructions that execute on the computer or other programmable data processing apparatus provide operations for implementing the functions specified in the flowchart block or blocks.

In addition, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "unit", as used in an embodiment of the disclosure, means, but is not limited to, a software or hardware component, such as field programmable gate array (FPGA) or application specific integrated circuit (ASIC), which performs certain tasks. However, "unit" is not meant to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". Further, the components and "units" may be implemented to operate one or more central processing units (CPUs) in a device or a security multimedia card. Further, in an embodiment of the disclosure, "unit" may include one or more processors.

Hereinafter, in describing the disclosure, description of the related known functions or configurations incorporated herein will be omitted if it is determined that they obscure the subject matter of the disclosure. Hereinafter, embodiments of the disclosure will be described with reference to the accompanying drawings.

Hereinafter, terms for identifying a connection node, terms for calling network entities, terms for calling messages, terms for calling an interface between network entities, and terms for calling various pieces of identification information, as used in the following description, are exemplified for convenience in explanation. Accordingly, the disclosure is not limited to the terms to be described later, but other terms for calling objects having equal technical meanings may be used.

Hereinafter, for convenience in explanation, terms and names that are defined in the LTE and new radio (NR) standards, which are the latest standards being defined in the 3rd generation partnership project (3GPP) group among currently existing communication standards, are used in the disclosure. However, the disclosure is not limited by the terms and names, but can be equally applied to systems complying with other standards. In particular, the disclosure can be applied to the 3GPP NR (5th generation mobile communication standards). In addition, the embodiments of the disclosure can be applied even to other communication systems having similar technical backgrounds or channel types. Further, the embodiments of the disclosure can be applied even to other communication systems through partial modifications within a range that does not greatly get out of the range of the disclosure by the judgment of those skilled in the art.

The disclosure defines a method and an apparatus for an unmanned aerial service (UAS) provider to control communication of a user UE through a wireless communication system so that the communication is made only with respect to user UEs to which the communication being registered in an unmanned traffic management (UTM) device is allowed among user UEs subscribing in the UAS.

According to various embodiments of the disclosure, the UTM can prevent an unauthorized flight by identifying whether an actual communication target is a user UE to which the UAS communication is allowed and controlling the communication with the user UE to which the UAS communication is not allowed in a process in which a UAV UE and a UAV controller UE configure a communication path utilizing a wireless communication system.

FIG. 1 illustrates an overall structure of a system for providing UAS according to an embodiment of the disclosure.

Referring to FIG. 1, an unmanned aerial system (UA system) for providing an unmanned aerial service (UAS) may include at least one of an unmanned aerial vehicle (UAV) 122 and an UAV controller 121, a radio access network (RAN) 130 and a core network (CN) 140 of a wireless communication system (or mobile communication system), and an UAS traffic management (UTM) 110 for providing additional information to an UAS UE (the UAV 122 and/or the UAV controller 121) and controlling an operation of the UAS UE. Further, the UAS may further include a regulatory providing flight regulation information of the government or the like. Of course, the constituent elements of the UA system are not limited to those as exemplified above, and the system for providing the UAS service may include constituent elements that are more than or less than the constituent elements illustrated in FIG. 1. Further, at least one of the above-described constituent elements may provide an operation or a function of another constituent element.

According to an embodiment of the disclosure, the UAV 122 (hereinafter, described as UAV, UAV UE, or UAV device) may include various aerial devices, such as a flying object, carrier, and aircraft, which can provide the UAS. For example, the UAV 122 may include an airplane, helicopter, drone, and robot, but is not limited thereto, and may include various types of aerial devices that can provide services in a flying area regardless of their shapes or structures.

According to an embodiment of the disclosure, the UAV controller 121 (hereinafter, described as UAV controller, UAV controller UE, or UAV controller device) may control at least one UAV. For example, the UAV controller 121 may control the location, flight, path, and speed of the UAV. Of course, the operation of the UAV controller 121 is not limited to the above-described example.

According to an embodiment of the disclosure, the RAN 130 and the CN 140 may be constituent elements included in a wireless communication network. The RAN 130 may be configured to take charge of wireless connection with a wireless UE (e.g., UAV or UAV controller). For example, the RAN 130 may include a base station. The base station may include an LTE base station (e.g., eNodeB) or an NR base station (gNodeB).

Further, the CN 140 may process data received from the wireless UE through the RAN 130, include network elements providing connections with other networks, and include a 5G core network and an evolved packet system (EPS).

According to an embodiment of the disclosure, the constituent elements included in the UAS service system of FIG. 1 may be a network function (NF). Further, the network function may be called a network entity. Of course, the constituent elements are not limited to the above-described example, and may be a separate configuration that is not the network function.

Referring to FIG. 1, the UTM 110 may be an UAS UE, that is, may be a constitution for tracking and managing registration and movement of the UAV 122 and the UAV controller 121. The UTM 110 may collect information on a location change of the UAS UE periodically or through designation of a specific condition from the UAS UE and the mobile communication network, and if the UE secedes from a flight allowed area, the UTM 110 may perform a necessary operation to control the UAV UE to stop the flight or to return to the flight allowed area in consideration of the flight control information designated in the regulatory.

Further, according to an embodiment of the disclosure, the UTM 110 may transfer, to the UAS UE and the mobile communication system (e.g., RAN and/or CN), information related to the flight restriction area of the UAS UE in advance or during service through a UE registration process or through a separate message.

According to an embodiment of the disclosure, an UAS control message may be transmitted or received between the UAS UE and the UTM 110 through the RAN 130 and the CN 140 of the wireless communication system. Specifically, a data session may be established between the UAV 122 and the UTM 110, and through the established data session, the UAV 122 and the UTM 110 may transmit or receive the UAS control message. Alternatively, a data session may be established between the UAV controller 121 and the UTM 110, and through the established data session, the UAV controller 121 and the UTM 110 may transmit or receive the UAS control message.

Figure 2:
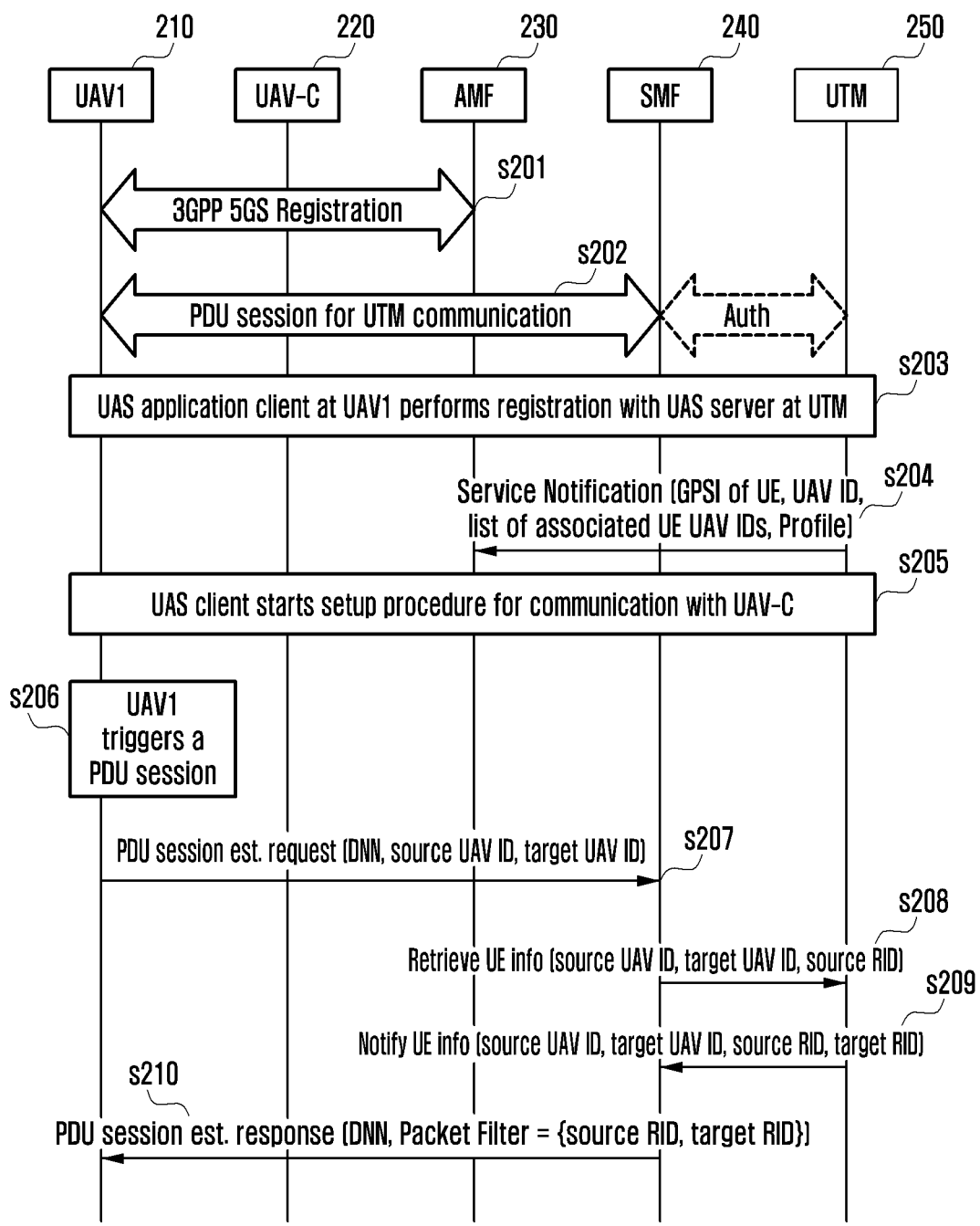
FIG. 2 is a signal flowchart in case that a data transmission path between a UAS user equipment (UE) and a unmanned aerial vehicle (UAV) controller UE is configured and controlled through a wireless communication system according to an embodiment of the disclosure.

FIG. 2 is a signal flowchart in case that a data transmission path between a UAS UE and a UAV controller UE is allowed is identified through a UTM in a wireless communication system, and a transmission path is controlled so as to transfer data with respect to a designated pair according to an embodiment of the disclosure.

Referring to FIG. 2, it illustrates a signal flowchart in case that a data transmission path between a UAS UE and a UAV controller UE is configured and controlled through a wireless communication system.

An example of FIG. 2 represents an operation in case that a UAV UE (hereinafter, UAV1) 210 starts a setup procedure for UAS communication with a UAV controller UE (hereinafter, UAV-C) 220 or 320 of FIG. 3. However, according to various embodiments of the disclosure, even if the UAV-C 220 starts the setup procedure for the UAS communication with the UAV1 210, an operation similar to the operation as exemplified in FIG. 2 may be performed. If the UAV-C 220 starts the setup procedure for the UAS communication with the UAV1 210, procedures being performed by the UAV1 210 illustrated in FIG. 2, that is, operations for the UAS communication with the UAV-C 210, may be performed by the UAV-C 220.

The method according to an embodiment of the disclosure may include at least one of operations illustrated in FIG. 2. All of the operations illustrated in FIG. 2 are not essential constitutions, and the bottommost constitution for identifying whether communication between the UAV1 210 and the UAV-C 220 is allowed and controlling a transmission path so as to transfer data with respect to the designated pair may be configured as the essential operations.

Referring to FIG. 2, at operation S201, the UAV1 210 may perform an initial access procedure with an access and mobility function (AMF) 230 of the wireless communication system so as to perform registration at an UTM 250 for the UAS start. In the initial access procedure, the UAV1 210 may transmit a registration request message to the AMF 230 of a 5G network, and if the registration has been successfully performed, the UAV1 210 may receive a registration response message from the AMF 230.

At operation S202, the UAV1 210 may perform a protocol data unit (PDU) session setup procedure to request a data session from a session management function (SMF) 240 of the 5G network for communication path setup with the UTM 250. In this case, in the process of performing the PDU session setup procedure depending on the contract and settings between a UAS service provider and a mobile communication service provider, the UAV1 210 may be enabled to perform an authentication process for UAS usage with the UTM 250, and depending on the implementation and settings, the authentication process may be omitted. In FIG. 2, such an authentication is denoted by a dotted line on the right of operation S202 between the SMF 240 and the UTM 250.

At operation S203, the UAV1 210 may perform an UAS registration process at the UTM 250 through the transmission path of the data session set at operation S202. The UAS registration process may be performed between UAS applications mounted on the UAV1 210 and the UTM 250, and the UAV1 210 may provide an UE identifier registered in its own UAS, and, as needed, may perform an authentication process (it may be omitted if it has been performed at operation S202), and if the registration has been successfully completed, may receive, from the UTM 250, an UAV ID assigned to the UAV1 210 together with the result of the registration. The UAV ID is used as an identifier for identifying the UAV1 210 at data session setup operation with the UAV-C 220 in the future, and is assigned by the UTM 250. Depending on the implementation, the 5G network (NW) may select in advance and transfer the UAV ID to the UTM 250 in the process at operation S202. The UAV ID may be used as a globally unique value together with (or including) a 5G NW ID to uniquely identify the UAV1 210.

At operation S204, the UTM 250 may transfer generic public subscriber identifier (GPSI) information of the UAV1 210 that can be identified in the 5G network and UAV ID information assigned to the UAV1 210 with respect to the UAV1 210 having succeeded in the UAS registration to the AMF 230 through the 5G network, for example, the SMF 240, and in addition, the UTM 250 may transfer a list (e.g., including at least one UAS controller) of communication-allowed UAS UEs (associated UAV IDs) with respect to the UAV 210. Further, the list can additionally include QoS profile information that is usable between the UAV1 210 and each UAS UE. According to circumstances, the SMF 240 may store the above-described information, and transfer the information to the AMF 230.

At operation S205, the UAV1 210 may select one UAV controller (e.g., UAV-C 220) among communicable targets in accordance with a request from a user or an application, and may start a path setup process for communication.

At operation S206, the UAV1 210 may trigger a session setup process to the 5G network for the UAS communication with the UAV-C 220.

At operation S207, the UAV1 210 may transmit a signal message to request a PDU session setup including an opposite UAV ID (target UAV ID) to the SMF 240 of the 5G network. The message may further include a data network name (DNN) set for the UAS and its own UAV ID (source UAV ID). The PDU session setup request message may be transferred to the SMF 240 through the AMF 230 of the 5G network.

At operation S208, the SMF 240 having received the PDU session setup request message may identify whether the received message corresponds to request information of the UAV1 210, and in order to obtain routing information of an opposite UAV (UAV-C 220), the SMF 240 may transmit an UE information retrieval (Retrieve UE Info) message including the UAV ID (target UAV ID) of the UAV-C 220 to the UTM 250. The routing information is UE information being used to perform the UAS communication between UEs using the 5G network, and is information defined by the 5G network. For example, the routing information may include an address of the corresponding UE. The Retrieve UE Info message may additionally include a source routing ID (RID), which is an example of the routing information assigned by the SMF 240 with respect to the UAV1 210 having requested the message, together with the source UAV ID, and thus may enable the UTM 250 to update and store the routing information of the UAV1 210.

At operation S209, the UTM 250 may extract the routing information (target RID) stored for the UAV-C 220 corresponding to the target UAV ID requested by the 5G network, and transmit the routing information to the SMF 240 through an UE information notification (Notify UE Info) message. For example, this embodiment relates to an operation in case that the UTM 250 stores in advance the routing information of the UAV-C 220. The Notify UE Info message may further include at least one of the source UAV ID, target UAV ID, and source RID.

At operation S210, the SMF 240 may identify the RID information (target RID) set in the target UAV ID, set a packet filter rule of a PDU session being newly set using the corresponding information so that communication becomes possible only between the UAV1 210 having requested the session and the UAV-C 220, and set the PDU session having the RID of the UAV1 210 (source RID) as the source address and having the RID of the UAV-C 220 (target RID) as the target address. Through such an operation, according to an embodiment of the disclosure, security between the UE pair performing the UAS communication using the 5G communication system can be kept. Further, a PDU session setup response message including the corresponding setup information can be transmitted to the UAV1 210.

Figure 3:
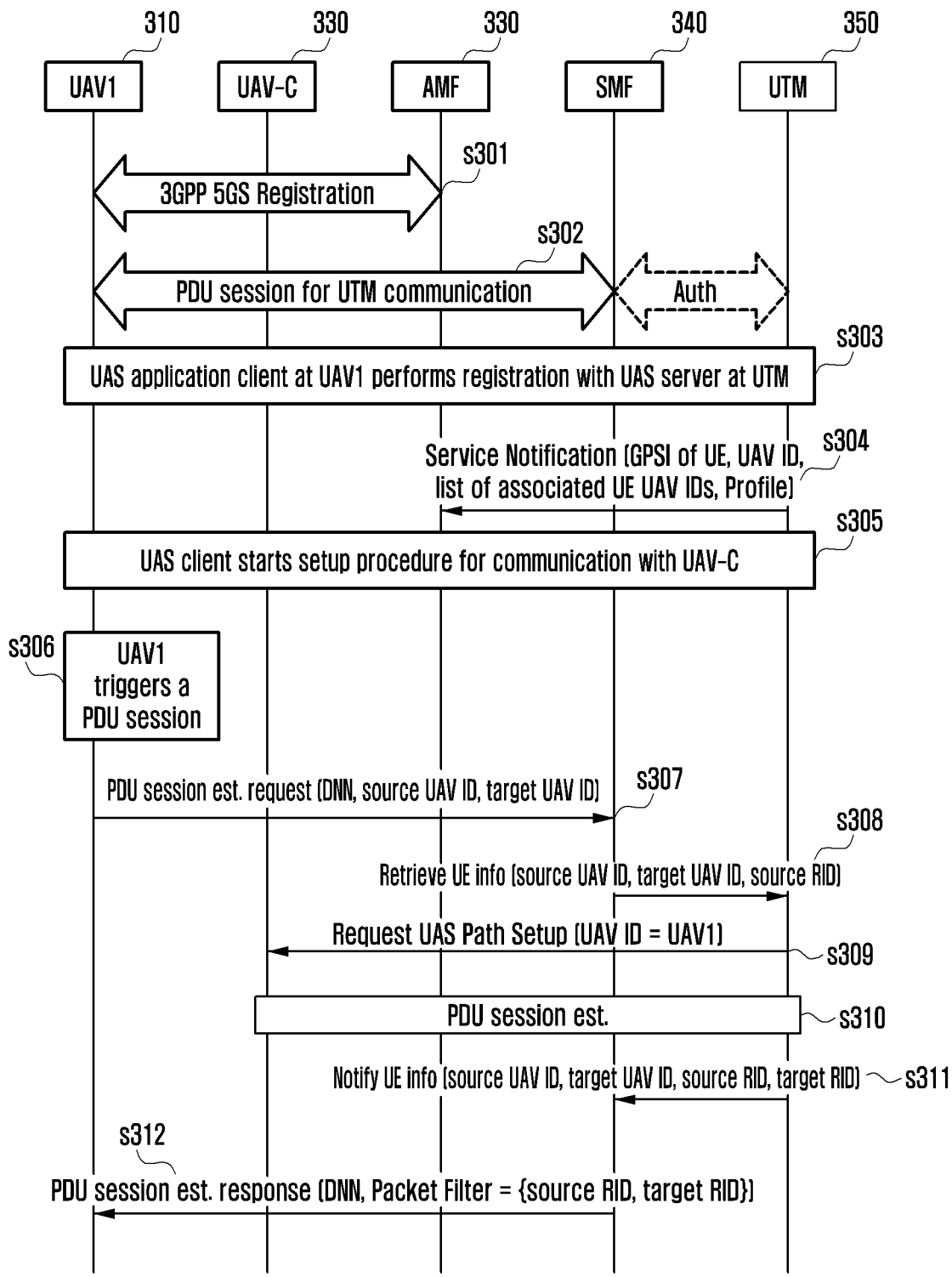
FIG. 3 is a signal flowchart in case that a data transmission path between a UAS UE and a UAV controller UE is configured and controlled through a wireless communication system according to an embodiment of the disclosure.

FIG. 3 is a signal flowchart in case that a data transmission path between a UAS UE and a UAV controller UE is configured and controlled through a wireless communication system. Moreover, a transmission path is controlled so as to transfer data with respect to a designated pair according to another embodiment of the disclosure, and explaining an operation of the proposed method in case that routing information of an opposite UE has not yet been configured.

Referring to FIG. 3, it represents an operation in case that a UAV UE (hereinafter, UAV1) 310 starts a configuration procedure for UAS communication with a UAV controller UE (hereinafter, UAV-C) 320. However, according to various embodiments of the disclosure, even if the UAV-C 320 starts the configuration procedure for the UAS communication with the UAV1 310, an operation similar to the operation as exemplified in FIG. 3 may be performed. If the UAV-C 320 starts the configuration procedure for the UAS communication with the UAV1 310, operations for the UAV1 310 illustrated in FIG. 3 to perform the UAS communication with the UAV-C 320 may be performed by the UAV-C 320.

The method according to an embodiment of the disclosure may include at least one of operations illustrated in FIG. 3. All of the operations illustrated in FIG. 3 are not essential constitutions, and the bottommost constitutions for identifying whether communication between the UAV1 310 and the UAV-C 320 is allowed and controlling a transmission path so as to transfer data with respect to the designated pair may be configured as the essential operations.

The processes of operations S301 to S307 exemplified in FIG. 3 are equal to the operations S201 to S207 explained in case of FIG. 2. Accordingly, duplicate explanation of the same operations will be omitted.

Referring to FIG. 3, at operation S308, the UTM 350 may receive a Retrieve UE Info message from an SMF 340 of a 5G network. In this case, the UTM 350 is in a state where routing information (target RID) of the UAV-C 320, having been requested from the SMF 340, is not stored therein. The UTM 350 is different from that of the example of FIG. 2 on the point that the routing information (target RID) of the UAV-C 320, having been requested from the SMF 340, is not stored therein.

At operation S309, the UTM 350 may transfer an UAS application signal message for requesting to proceed with data session setup so as to register the routing information to the UAV-C 320 in which the routing information has not been configured. In this case, in order for the UAV-C 320 to be able to know information on the UAV1 310 having sent the corresponding request, the UTM 350 may include the UAV ID value of the UAV1 310 in the message to be transferred.

At operation S310, the UAV-C 320 may proceed with the same PDU session setup process as the process of operations S305 to S308, and in this process, the SMF 340 of the 5G network may assign the routing information corresponding to the PDU session requested by the UAV-C 320, and transfer the routing information to the UTM 350.

At operation S311, the UTM 350 may transfer a Notify UE Info message including the routing information (target RID) of the UAV-C 320 to the SMF 340. The Notify UE Info message may further include at least one of a source UAV ID, target UAV ID, and source RID.

At operation S312, the SMF 340 may identify the RID information (target RID) configured in the target UAV ID, may configure a packet filter rule of a PDU session being newly configured using the corresponding information so that communication becomes possible only between the UAV1 310 having requested the session and the UAV-C 320, and set the PDU session having the RID of the UAV1 310 (source RID) as the source address and having the RID of the UAV-C 320 (target RID) as the target address. Through such an operation, according to an embodiment of the disclosure, security between the UE pair performing the UAS communication using the 5G communication system can be kept. Further, a PDU session setup response message including the corresponding configuration information can be transmitted to the UAV1 310.

Figure 4:
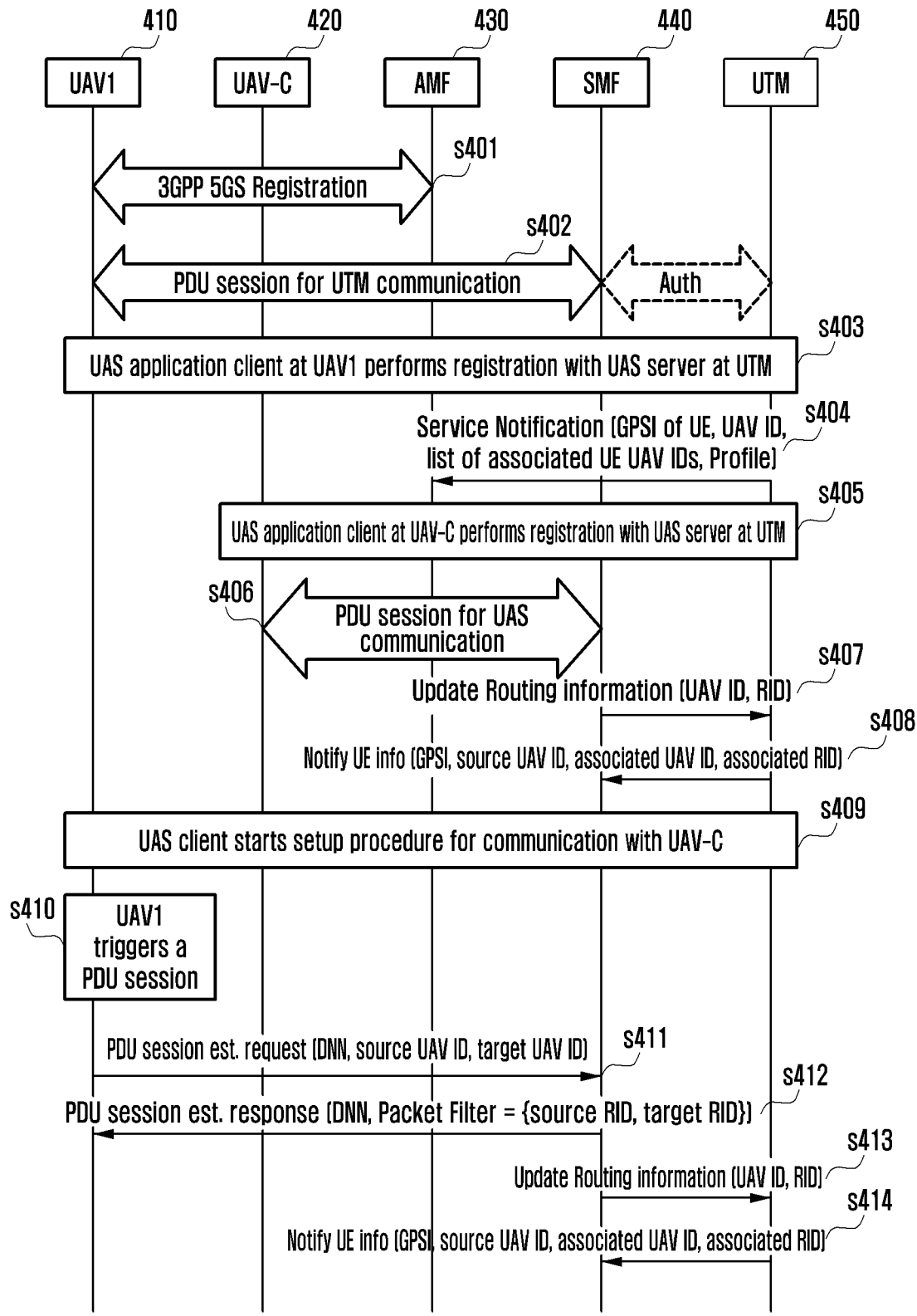
FIG. 4 is a signal flowchart in case that a data transmission path between a UAS UE and a UAV controller UE is configured and controlled through a wireless communication system according to an embodiment of the disclosure.

FIG. 4 is a signal flowchart in case that a data transmission path between a UAS UE and a UAV controller UE is configured and controlled through a wireless communication system. Moreover, a transmission path is controlled so as to transfer data with respect to a designated pair according to still another embodiment of the disclosure, and explaining an operation of the proposed method in case that a 5G network receives in advance and stores update information from an UTM in a process in which routing information of an opposite UE is configured.

Referring to FIG. 4, it represents an operation in case that a UAV UE (hereinafter, UAV1) 410 starts a configuration procedure for UAS communication with a UAV controller UE (hereinafter, UAV-C) 420. However, according to various embodiments of the disclosure, even if the UAV-C 420 starts the configuration procedure for the UAS communication with the UAV1 410, an operation similar to the operation as exemplified in FIG. 4 may be performed. If the UAV-C 420 starts the configuration procedure for the UAS communication with the UAV1 410, procedures being performed by the UAV1 410 illustrated in FIG. 4, that is, operations for the UAS communication with the UAV-C 420, may be performed by the UAV-C 420.

The method according to an embodiment of the disclosure may include at least one of operations illustrated in FIG. 4. All of the operations illustrated in FIG. 4 are not essential constitutions, and the bottommost configurations for identifying whether communication between the UAV1 410 and the UAV-C 420 is allowed and controlling a transmission path so as to transfer data with respect to the designated pair may be configured as the essential operations.

The processes of operations S401 to S404 in FIG. 4 are performed equally to the operations of the corresponding processes of FIGS. 2 and 3. Accordingly, duplicate explanation of the same operations will be omitted.

Referring to FIG. 4, at operation S405, the UAV-C 420 that is an opposite UE may perform an UAS registration process with an UTM 450.

At operation S406, the UAV-C 420 may perform proceeding in advance with a data session setup process for performing the UAS communication with the UAV UE 410 in the future. Depending on the implementation, a PDU session setup request may be made in a state where an opposite UE is not designated (or a value designated as a dummy is used), or the PDU session setup may be performed in a communication process with another UAV UE.

At operation S407, after the PDU session setup is successfully completed, the UTM 450 may receive and store routing information of the UAV-C 420 from the SMF 440 or AMF 430 of the 5G network. The example of FIG. 4 exemplifies a case that the routing information of the UAV-C 420 is received from the SMF 440. In this case, when receiving and storing the routing information of the UAV-C 420, the UTM 450 may store the routing information of the UAV-C 420 in association with the UAV ID.

At operation S408, the UTM 450 may transfer updated routing information of the corresponding UAV-C 420 to the SMF 440 of the 5G network to which the UE belongs with respect to all UEs whose communication with the corresponding UAV-C 420 is allowed. The SMF 440 of the 5G network, having received the updated routing information, may store the updated routing information of the UAV-C 420 in association with the respective UAV UEs designated by the UTM 450. The above-described process may be performed whenever the routing information of the UAV-C 420 is updated by movement of the UAV-C 420.

Through operations S409 to S411, the UAV1 410 may perform the data session setup process for the UAS communication with the UAV-C 420. This is equal to the operation in FIGS. 2 and 3 as described above. For example, operation S409 of FIG. 4 corresponds to operation S205 of FIG. 2, operation S410 of FIG. 4 corresponds to operation S206 of FIG. 2, and operation S411 of FIG. 4 corresponds to operation S207 of FIG. 2.

At operation S412, the SMF 440 having received the PDU session setup request message from the UAV1 410 may identify whether the routing information of the UAV-C 420 included in the PDU session setup request message requested by the UAV1 410 has a correct value by utilizing the routing information (target RID) of the UAV-C 420, previously received from the UTM 450, set the PDU session (i.e., PDU session having the RID of the UAV 410 (source RID) as the source address and having the RID of the UAV-C 420 (target RID) as the target address) by rejecting an erroneous PDU session setup request or replacing the routing information by a correct value, and transmit the PDU session setup response message including the set packet filter rule to the UAV1 410. Through such an operation, according to an embodiment of the disclosure, security between the UE pair performing the UAS communication using the 5G communication system can be kept.

At operation S413, the SMF 440 may transfer the routing information (RID) assigned to the UAV1 410 to the UTM 450 in association with the UAV ID (according to circumstances, the AMF 430 may transfer the routing information). At operation S413, the UTM 450 may update the routing information stored with respect to the corresponding UAV1 410 based on the information received from the SMF 440.

At operation S414, the UTM 450 may update the packet filter rule of the corresponding PDU session in the 5G network through transmission of the updated routing information of the UAV1 410 to the SMF 440 of the 5G network to which the UAV-C 420 belongs, and control the UAS communication to be performed only between the designated UE pair.

Figure 5:
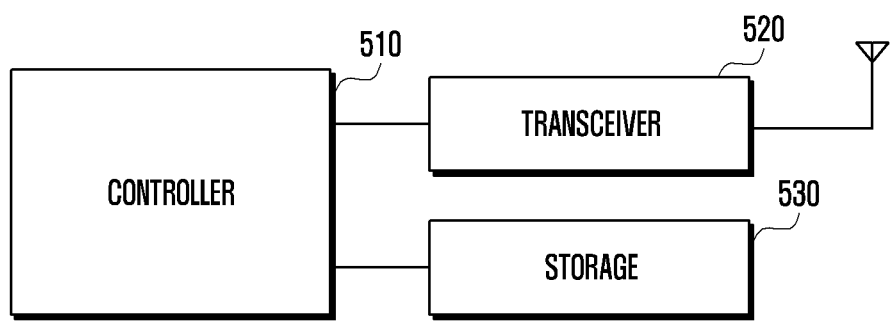
FIG. 5 is a diagram illustrating a schematic configuration of a UAS UE (UAV or UAV controller) according to an embodiment of the disclosure.

FIG. 5 is a diagram illustrating a schematic configuration of a UAS UE (UAV or UAV controller) according to an embodiment of the disclosure.

Referring to FIG. 5, a UAS UE may include at least one of a controller 510, a transceiver 520, and a storage 530.

The transceiver 520 may transmit or receive signals, information, messages, and data to or from a network device according to various embodiments of the disclosure. In this case, the transceiver 520 may include an RF module for transmitting and receiving the signals, information, messages, and data through a RAN 130.

The controller 510 may control an operation according to various embodiments of the disclosure. For example, in case that an UAS UE is a UE that starts a setup procedure for UAS communication, the controller 510 may control the operation of the UAV1 illustrated in FIGS. 2 to 4. In contrast, in case that the UAS UE is an opposite UE in the configuration procedure for the UAS communication, the controller 510 may control the operation of the UAV-C illustrated in FIGS. 2 to 4. Further, in case that the UAV-C starts the configuration procedure for the UAS communication, the controller 510 may control the operation corresponding to the UAV1 described above with reference to FIGS. 2 to 4.

According to various embodiments of the disclosure, in order to control the communication between an UAV UE and an UAV controller UE, the controller 510 may control registration into a wireless communication system, configure a communication path for control message transmission/reception at an UTM, and perform registration for using an UAS service at the UTM. Under the assumption of the registration at the UTM, the controller 510 may configure a data transmission path through the wireless communication system for data transmission/reception with the opposite UE (e.g., PDU session setup request), and according to various embodiments of the disclosure, in a process of setting the data transmission path, the wireless communication system may identify whether to allow the communication with the opposite UE requested by the UE through the UTM, obtain routing information of the opposite UE, and set a communication parameter so that the data communication is performed only with respect to the designated opposite UE.

For example, the controller 510 may determine to perform the UAS communication with the opposite UE at an application level, control to transmit a PDU session setup request message including UAS service level identification information (target UAV ID) of the opposite UE to the network, and control to receive a PDU session setup response message for the PDU session set based on network level identification information (target RID) corresponding to the UAS service level identification information of the opposite UE and network level identification information (source RID) of the UE. In the PDU session, a packet filter rule may be configured so that communication is possible only between the UE and the opposite UE based on the network level identification information of the UE and the network level identification information of the opposite UE.

According to various embodiments of the disclosure, referring to FIGS. 2 to 4, the network level identification information of the opposite UE may be featured to be pre-stored in the unmanned traffic management (UTM), to be obtained by requesting the opposite UE to configure the PDU session in case that the UTM receives the UAS service level identification information of the opposite UE transferred from the network, or to be pre-stored in the network.

The storage 530 stores therein information generated by the UAS UE and information obtained from the network under the control of the controller 510.

Figure 6:
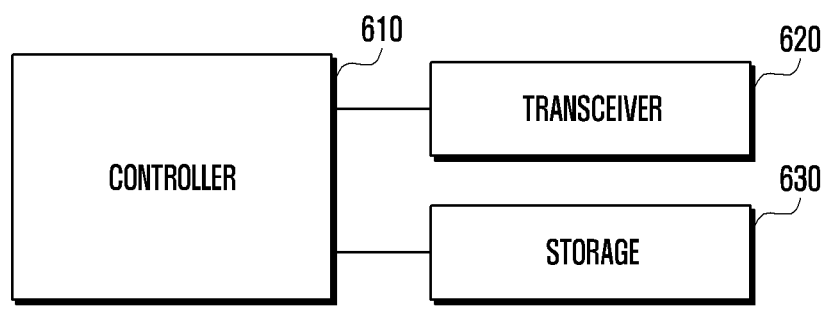
FIG. 6 is a diagram illustrating an schematic configuration of a network entity according to an embodiment of the disclosure.

FIG. 6 is a diagram illustrating a schematic configuration of a network entity according to an embodiment of the disclosure.

Referring to FIG. 6, a network entity (or network device) may include at least one of SMF and AMF. The network entity may include at least one of a controller 610, a transceiver 620, and a storage 630.

The transceiver 620 may transmit or receive signals, information, and data to or from UAS UEs and an UTM according to various embodiments of the disclosure.

The controller 610 may control the operation of the network entity illustrated in FIGS. 2 to 4 according to various embodiments of the disclosure.

For example, the controller 610 may control to receive a PDU session setup request message of UE, including UAS service level identification information (target UAV ID) of an opposite UE, to obtain network level identification information (target RID) of the opposite UE based on the UAS service level identification information of the opposite UE, and to transmit a PDU session setup response message for the PDU session set based on the network level identification information of the opposite UE and the network level identification information (source RID) of the UE. In the PDU session, a packet filter rule may be configured so that communication is possible only between the UE and the opposite UE based on the network level identification information of the UE and the network level identification information of the opposite UE.

According to various embodiments of the disclosure, referring to FIGS. 2 to 4, in obtaining the network level identification information of the opposite UE, the controller 610 may be featured to receive a pre-stored value from the UTM, to receive a value obtained by the UTM to request the opposite UE to set the PDU session based on the UAS service level identification information of the opposite UE, or to identify a value pre-stored in the network device.

The storage 630 stores therein information obtained by the UAS UE or UTM and information generated by the network under the control of the controller 610.

Figure 7:
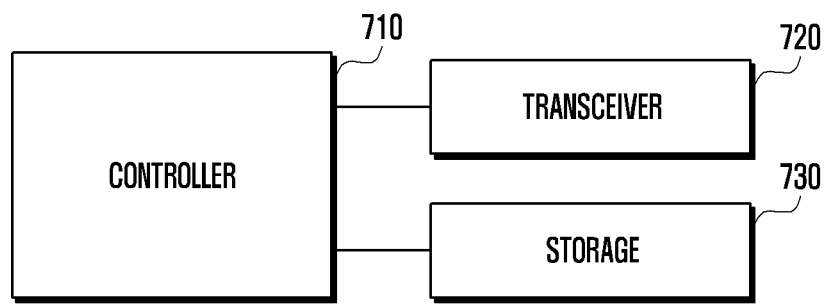
FIG. 7 is a diagram illustrating a schematic configuration of a UAS traffic management (UTM) according to an embodiment of the disclosure.

FIG. 7 is a diagram illustrating a schematic configuration of an UTM according to an embodiment of the disclosure.

Referring to FIG. 7, an UTM may include at least one of a controller 710, a transceiver 720, and a storage 730.

The transceiver 720 may transmit or receive signals, information, and data through a network according to various embodiments of the disclosure.

The controller 710 may control the operation of the UTM illustrated in FIGS. 2 to 4 according to various embodiments of the disclosure.

According to an embodiment of the disclosure, the controller 710 may identify whether to allow communication with an opposite UE, which is requested by an UE in a process of setting a data transmission path in accordance with a PDU session setup request from the UE. For example, the controller 710 may provide, to the network, network level identification information (target RID) corresponding to UAS service level identification information (target UAV ID) of the opposite UE.

According to various embodiments of the disclosure, referring to FIGS. 2 to 4, the network level identification information of the opposite UE may be a value pre-stored in the UTM, a value obtained by the UTM to request the opposite UE to configure the PDU session based on the UAS service level identification information of the opposite UE, or a value that the UTM provides in advance to the network device (based on the PDU session setup performed in advance by the opposite UE).

The storage 730 stores therein information obtained by the UAS UE or network and information generated by the UTM under the control of the controller 710.

It will be apparent to those of ordinary skill in the art to which the disclosure pertains that other modified examples that are based on the technical idea of the disclosure can be embodied. Further, as needed, the respective embodiments may be operated in combination. For example, parts of one embodiment and another embodiment of the disclosure may be combined with each other to operate a base station and UE. Further, the embodiments of the disclosure are applicable to other communication systems, and other modified examples based on the technical idea of the embodiments will be able to be embodied.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first entity performing a session management function (SMF) supporting an uncrewed aerial service (UAS) communication in a mobile communication system, the method comprising:
   receiving, from a user equipment (UE) associated with an uncrewed aerial vehicle (UAV), a protocol data unit (PDU) session establishment request message including a data network name (DNN) dedicated for a UAS, first identification information of the UAV, and second identification information of a UAV controller (UAV-C), wherein the UE associated with the UAV has performed an authentication with a second entity associated with a UAS traffic management (UTM);
   based on the PDU session establishment request message, obtaining addressing information of the UAV-C including an address of the UAV-C, from a second entity associated with the UTM;
   transmitting, to the UE, a PDU session response message; and
   establishing a PDU session between the UE associated with the UAV and the UAV-C based on the addressing information of the UAV-C,
   wherein the first identification information is assigned by the second entity associated with the UTM.

2. The method of claim 1, wherein the second identification information is assigned by the second entity associated with the UTM.

3. A method by a user equipment (UE) associated with an uncrewed aerial vehicle (UAV) supporting an uncrewed aerial service (UAS) communication in a mobile communication system, the method comprising:
   performing an authentication with a second entity associated with a UAS traffic management (UTM);
   transmitting, to a first entity performing a session management function (SMF), a protocol data unit (PDU) session establishment request message including a data network name (DNN) dedicated for a UAS, first identification information of the UAV, and second identification information of a UAV controller (UAV-C); and
   receiving, from the first entity performing the SMF, a PDU session response message,
   wherein addressing information of the UAV-C including an address of the UAV-C received from a second entity associated with the UTM is based on the PDU session establishment request message,
   wherein a PDU session between the UE associated with the UAV and the UAV-C is established based on the addressing information of the UAV-C, and
   wherein the first identification information is assigned by the second entity associated with the UTM.

4. The method of claim 3, wherein the second identification information is assigned by the second entity associated with the UTM.

5. A first entity performing a session management function (SMF) supporting an uncrewed aerial service (UAS) communication in a mobile communication system, the first entity comprising:
   a transceiver; and
   a controller configured to:
   receive, from a user equipment (UE) associated with an uncrewed aerial vehicle (UAV), a protocol data unit (PDU) session establishment request message including a data network name (DNN) dedicated for a UAS, first identification information of the UAV, and second identification information of a UAV controller (UAV-C), wherein the UE associated with the UAV has performed an authentication with a second entity associated with a UAS traffic management (UTM),
   based on the PDU session establishment request message, obtain addressing information of the UAV-C including an address of the UAV-C, from a second entity associated with the UTM,
   transmit, to the UE, a PDU session response message, and
   establish a PDU session between the UE associated with the UAV and the UAV-C based on the addressing information of the UAV-C,
   wherein the first identification information is assigned by the second entity associated with the UTM.

6. The first entity of claim 5, wherein the second identification information is assigned by the second entity associated with the UTM.

7. A user equipment (UE) associated with an uncrewed aerial vehicle (UAV) supporting an uncrewed aerial service (UAS) communication in a mobile communication system, the UE comprising:
   a transceiver; and
   a controller configured to:
   perform an authentication with a second entity associated with a UAS traffic management (UTM),
   transmit, to a first entity performing a session management function (SMF), a protocol data unit (PDU) session establishment request message including a data network name (DNN) dedicated for a UAS, first identification information of the UAV, and second identification information of a UAV controller (UAV-C), and
   receive, from the first entity performing the SMF, a PDU session response message, wherein addressing information of the UAV-C including an address of the UAV-C received from a second entity associated with the UTM is based on the PDU session establishment request message, and wherein a PDU session between the UE associated with the UAV and the UAV-C is established based on the addressing information of the UAV-C, and wherein the first identification information is assigned by the second entity associated with the UTM.

8. The UE of claim 7, wherein the second identification information is assigned by the second entity associated with the UTM.

* * * * *